(12) United States Patent
Tamaki et al.

(10) Patent No.: US 11,912,124 B2
(45) Date of Patent: Feb. 27, 2024

(54) TRACTOR

(71) Applicant: Kubota Corporation, Osaka (JP)

(72) Inventors: Yoshiyuki Tamaki, Osaka (JP); Kyota Inoue, Osaka (JP); Ryuichi Inoue, Osaka (JP); Masaru Shinya, Osaka (JP); Satoshi Nagata, Osaka (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/975,857

(22) Filed: Oct. 28, 2022

(65) Prior Publication Data

US 2023/0129702 A1 Apr. 27, 2023

(30) Foreign Application Priority Data

Sep. 30, 2021 (JP) .................................. 2021-162213

(51) Int. Cl.
*B60K 13/04* (2006.01)
*B62D 25/10* (2006.01)

(52) U.S. Cl.
CPC .............. *B60K 13/04* (2013.01); *B62D 25/10* (2013.01); *B60Y 2200/221* (2013.01)

(58) Field of Classification Search
CPC ... B60K 13/04; B62D 25/10; B60Y 2200/221
See application file for complete search history.

(56) References Cited

U.S. PATENT DOCUMENTS

| | | | | |
|---|---|---|---|---|
| 9,016,426 B2 * | 4/2015 | Himoto | .................... | F01N 3/103 |
| | | | | 180/309 |
| 9,175,455 B2 * | 11/2015 | Sakai | .................... | E02F 9/0866 |
| 9,238,901 B2 * | 1/2016 | Kamimae | ........... | F01N 13/1855 |

(Continued)

FOREIGN PATENT DOCUMENTS

| | | | | |
|---|---|---|---|---|
| DE | 102019117798 A1 * | 1/2020 | ............. | B60K 13/04 |
| JP | 2013-112284 A | 6/2013 | | |
| JP | 2015-143508 A | 8/2015 | | |
| JP | 2020012433 A * | 1/2020 | ............. | B60K 13/04 |
| WO | 2015093375 A1 | 6/2015 | | |

\* cited by examiner

OTHER PUBLICATIONS

Extended European Search Report issued in corresponding European Patent Application 22203870.5 dated Apr. 24, 2023 (7 pages).

*Primary Examiner* — Faye M Fleming
(74) *Attorney, Agent, or Firm* — Osha Bergman Watanabe & Burton LLP (57) ABSTRACT

A tractor includes: a vehicle body; an engine bonnet that forms an engine compartment; an engine disposed in the engine compartment; a first exhaust-gas cleaning device that is disposed in the engine compartment and purifies exhaust gas discharged by the engine; and a second exhaust-gas cleaning device that is disposed in the engine compartment and purifies the exhaust gas, the first exhaust-gas cleaning device being disposed above the engine such that a long side of the first exhaust-gas cleaning device is substantially parallel to a vehicle-body lateral width direction, the second exhaust-gas cleaning device being disposed behind the engine such that a long side of the second exhaust-gas cleaning device is substantially parallel to the vehicle-body lateral width orientation, and a maximum vertical length of the first exhaust-gas cleaning device is shorter than a maximum longitudinal length of the first exhaust-gas cleaning device.

7 Claims, 9 Drawing Sheets

(56) References Cited

U.S. PATENT DOCUMENTS

2019/0337377 A1* 11/2019 Herwat .................. B60K 13/04
2023/0159109 A1*  5/2023 Nagata ................. B62D 25/082
                                                          180/69.2

TRACTOR

BACKGROUND

Technical Field

The present invention relates to a tractor.

Description of Related Art

As shown in patent literature 1 and 2, for example, the tractor is equipped with an engine bonnet (bonnet) that forms an engine compartment, and in the engine compartment, an exhaust-gas cleaning device (exhaust-gas cleaning process device) is installed above the engine.

PRIOR ART LITERATURE

[Patent Literature 1] JP 2013-112284 A
[Patent Literature 2] JP 2015-143508 A

There is a demand for a tractor to be provided with a plurality of exhaust-gas cleaning devices for cleaning exhaust gas discharged from an engine. Examples of the plurality of exhaust-gas cleaning devices include an exhaust-gas cleaning device that cleans exhaust gas using a cleaning filter and an exhaust-gas cleaning device that cleans exhaust gas using a reducing agent.

When the conventional art is adopted and the first exhaust-gas cleaning device and the second exhaust-gas cleaning device are installed in the engine compartment, the first exhaust-gas cleaning device and the second exhaust-gas cleaning device are located above the engine, and thus, even when the size of one of the first exhaust-gas cleaning device and the second exhaust-gas cleaning device is smaller than the size of the other exhaust-gas cleaning device, the mounting height of the engine bonnet must be set to correspond to the larger exhaust-gas cleaning device. Therefore, the mounting height of the engine bonnet is increased.

SUMMARY

One or more embodiments of the present invention provide a tractor for which it is possible to provide a first exhaust-gas cleaning device and a second exhaust-gas cleaning device in an engine compartment while keeping the mounting height of the engine bonnet low and keeping the front-back length of the engine compartment short.

The tractor according to one or more embodiments of the present invention comprises a vehicle body, an engine bonnet forming an engine compartment, an engine disposed in the engine compartment, and a first exhaust-gas cleaning device and a second exhaust-gas cleaning device provided in the engine compartment for cleaning or purifying exhaust gas discharged from the engine, wherein the first exhaust-gas cleaning device is provided above the engine such that its long side is substantially parallel to a vehicle-body lateral width direction (or a vehicle-body horizontal direction), and the second exhaust-gas cleaning device is provided behind the engine such that its long side is substantially parallel to the vehicle-body lateral width direction, and the maximum length of the first exhaust-gas cleaning apparatus in a vehicle-body vertical direction (or a vehicle-body up-down direction) is shorter than the maximum length of the first exhaust-gas cleaning device in a vehicle-body longitudinal direction (or a vehicle-body front-back direction).

According to this configuration, the first exhaust-gas cleaning device, which is the smaller of the first exhaust-gas cleaning device and the second exhaust-gas cleaning device, is installed above the engine, and the larger second exhaust-gas cleaning device is installed behind the engine, and the mounting height of the engine bonnet can be set based on the size of the small first exhaust-gas cleaning device. Furthermore, since the maximum length of the first exhaust-gas cleaning device in the vehicle-body vertical direction is shorter than the maximum length in the vehicle-body longitudinal direction, the mounting height of the engine bonnet can be made lower than in the opposite case. Since the long sides of both the first and second exhaust-gas cleaning devices are substantially parallel to the vehicle-body lateral width direction, the first and second exhaust-gas cleaning devices can be accommodated compared to the case where the long sides are substantially parallel to the vehicle-body longitudinal direction, and it is possible to shorten the length of the space in the vehicle-body longitudinal direction necessary for the installation of the first exhaust-gas cleaning device, while keeping the mounting height of the engine bonnet low and the longitudinal length of the engine compartment, and a second exhaust-gas cleaning device can be provided in the engine compartment.

In one or more embodiments of the present invention, the second exhaust-gas cleaning device is provided with an exhaust-gas introduction portion (i.e., an exhaust-gas introduction pipe) for introducing the exhaust gas discharged from the first exhaust-gas cleaning device, and the exhaust-gas introduction portion extends backward and obliquely upward from the second exhaust-gas cleaning device.

In order to connect the first exhaust-gas cleaning device and the second exhaust-gas cleaning device, a set interval of a width set due to the structure, length, and the like of the connection member must be provided between the first exhaust-gas cleaning device and the exhaust-gas introduction portion of the second exhaust-gas cleaning device. According to the present configuration, because the exhaust-gas introduction portion extends backward and obliquely upward from the second exhaust-gas cleaning device, the set interval can be ensured while the first exhaust-gas cleaning device and the second exhaust-gas cleaning device are closer to each other in the vehicle-body longitudinal direction compared to extending forward and obliquely upward or directly upward from the second exhaust-gas cleaning device; therefore, the first exhaust-gas cleaning device and the second exhaust-gas cleaning device can be provided in the engine compartment while keeping the front-back length of the engine compartment short.

The tractor according to one or more embodiments of the present invention is provided with an exhaust-gas suction portion (i.e., an exhaust-gas suction pipe) for sucking exhaust gas from the engine at a portion of the first exhaust-gas cleaning device on one end side in the vehicle-body lateral width direction, wherein an exhaust-gas discharge portion (i.e., an exhaust-gas discharge pipe) that discharges exhaust gas toward the second exhaust-gas cleaning device is provided in a portion on another end side in the vehicle-body lateral width direction in the first exhaust-gas cleaning device, and the first exhaust-gas cleaning device is attached to the engine in a state where a lateral-end portion of the first exhaust-gas cleaning device is swung and displaced toward a vehicle-body front side with respect to another lateral-end portion of the first exhaust-gas cleaning device with the exhaust-gas suction portion as a swinging shaft.

In order to connect the first exhaust-gas cleaning device and the second exhaust-gas cleaning device, a set interval of a width set due to the structure, length, and the like of the connection member must be provided between the exhaust-gas discharge portion of the first exhaust-gas cleaning device and the second exhaust-gas cleaning device. According to the present configuration, because the first exhaust-gas cleaning device has an installation disposition in which the portion on the other end side in the vehicle-body lateral width direction is swung and displaced toward the front side of the vehicle body relative to the portion on one end side in the vehicle-body lateral width direction in a state where the exhaust-gas suction portion is at the center of oscillation, the set interval can be ensured without changing the position of the exhaust-gas suction portion with respect to the engine side, and therefore the first exhaust-gas cleaning device and the second exhaust-gas cleaning device can be provided in the engine compartment while facilitating connection of the exhaust-gas suction portion to the engine side.

In one or more embodiments of the present invention, the back portion of the first exhaust-gas cleaning device and the second exhaust-gas cleaning device overlap in a plan view.

According to the present configuration, because the first exhaust-gas cleaning device and the second exhaust-gas cleaning device approach each other in the vehicle-body longitudinal direction, the length of the connecting member that connects the first exhaust-gas cleaning device and the second exhaust-gas cleaning device can be reduced.

The tractor according to one or more embodiments of the present invention is provided with a driving unit located behind the engine compartment, wherein a partition member (i.e., a partition) that separates the engine compartment from the driving unit is provided extending over a back location of the second exhaust-gas cleaning device and a lower location of the second exhaust-gas cleaning device, and a portion of the partition member positioned at the lower location is positioned further toward the vehicle-body front side than a portion of the partition member positioned at the back location.

According to this configuration, the leg space of the driving unit can be extended below the second exhaust-gas cleaning device, so that the leg space of the driving unit can be widened while the second exhaust-gas cleaning device is provided behind the engine.

The tractor according to one or more embodiments of the present invention is provided with an electrical wire extending over the engine compartment and the driving unit, wherein the electrical wire is installed along the portion of the partition member positioned at the lower location in the driving unit.

According to this configuration, it is possible to wire the electrical wires between the engine compartment and the driving unit so as not to come into contact with the legs of the work vehicle located in the driving unit.

DETAILED DESCRIPTION OF EMBODIMENTS

Embodiments of the present invention are described below based on the drawings.

Figure 1:
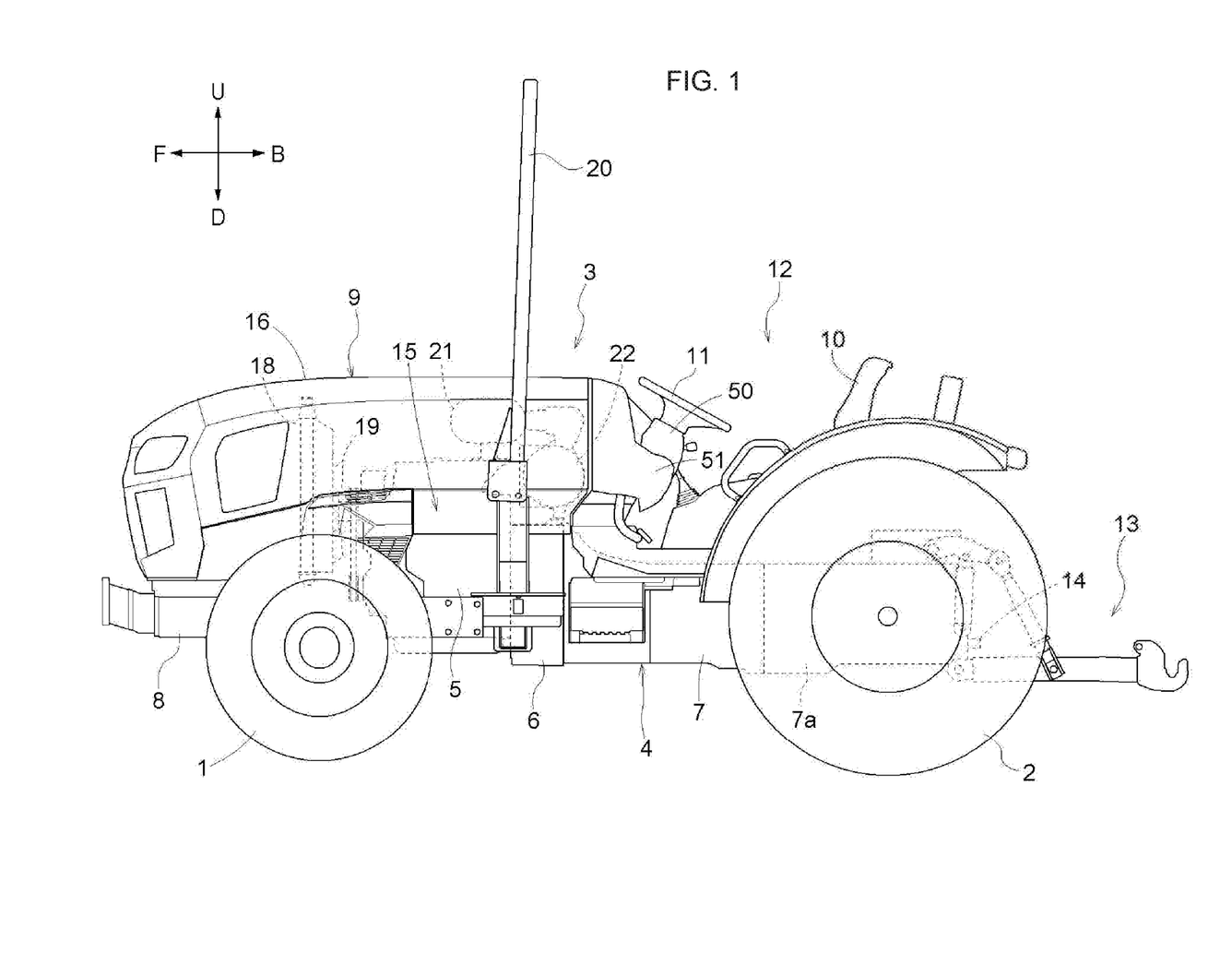
FIG. 1 is a left side view illustrating an entirety of a tractor.

Note that in the following description, in regards to a traveling vehicle body of a tractor, the direction of arrow F illustrated in FIG. 1 is defined as "vehicle-body front", the direction of arrow B is defined as "vehicle-body back", the direction of arrow U is defined as "vehicle-body up", the direction of arrow D is defined as "vehicle-body down", the direction heading toward the surface of the page is defined as "vehicle-body left", and the direction heading toward the reverse face of the page is defined as "vehicle-body right".

[Overall Configuration of Tractor]

As illustrated in FIG. 1, the tractor is provided with a traveling vehicle body 3 supported by a pair of left and right front wheels 1, which can be steered and driven, and a pair of left and right back wheels 2, which can be driven. A vehicle body frame 4 of the traveling vehicle body 3 is constituted by an engine 5, a flywheel housing 6 connected to a back portion of the engine 5, a clutch housing 7 connected to a back portion of the flywheel housing 6, a transmission case 7a connected to a back portion of the clutch housing 7, and a front frame 8 connected to a lower portion of the engine 5. A motor unit 9 provided with the engine 5 is formed in a front portion of the traveling vehicle body 3. A driver's seat 10 and a driving unit 12, which is provided with a steering wheel 11 whereby a steering operation of the front wheels 1 is performed, are formed in a back portion of the traveling vehicle body 3. A linking mechanism 13, which connects a work apparatus such as a rotary tilling apparatus (not illustrated) in a manner enabling a raising and lowering operation of the work apparatus, and a power takeoff shaft 14, which takes power from the engine 5 and outputs this to the connected work apparatus, are provided in a back portion of the transmission case 7a. Reference numeral 20 illustrated in FIG. 1 is a ROPS frame.

[Configuration of Motor Unit]

Figure 2:
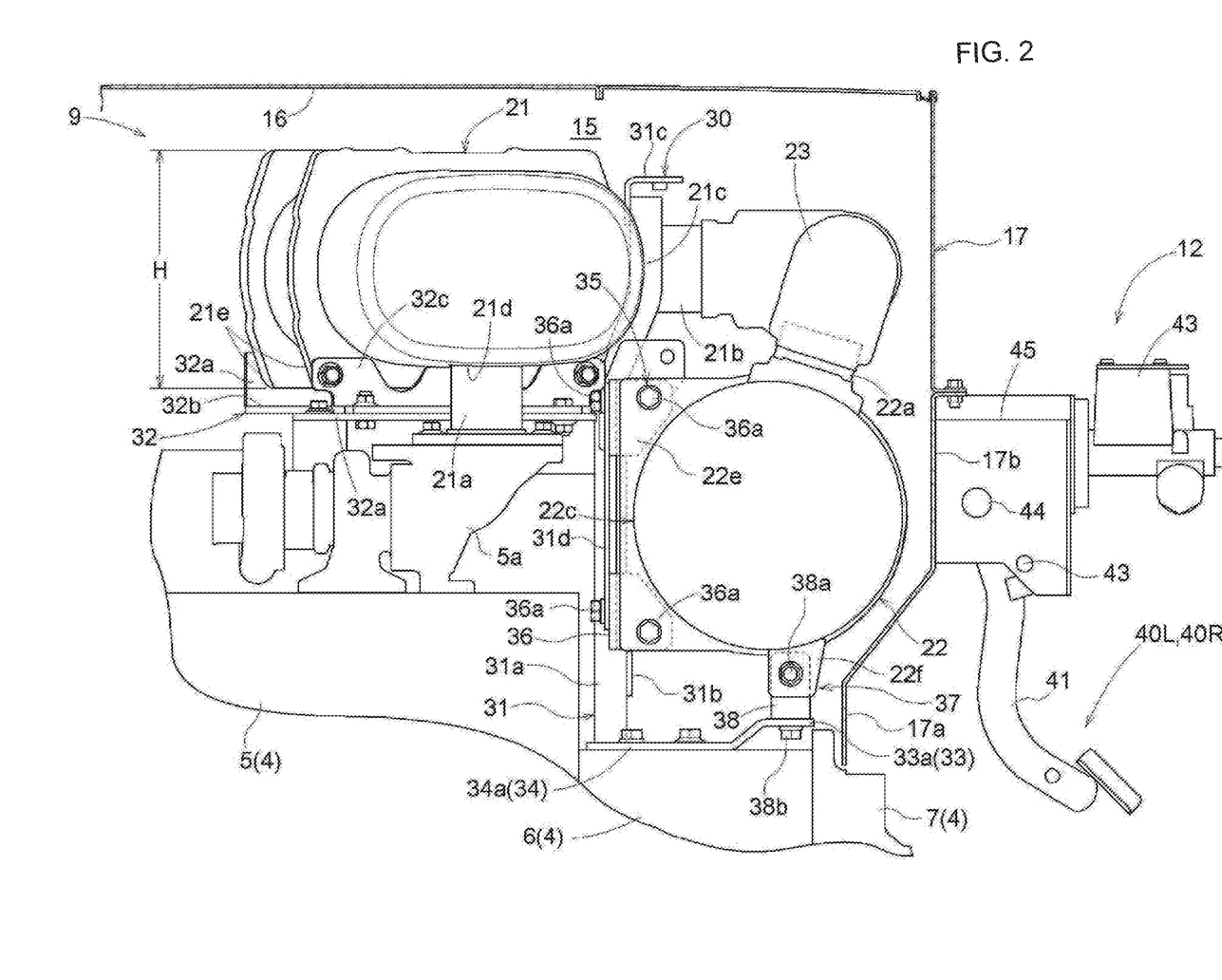
FIG. 2 is a left side view illustrating a first exhaust-gas cleaning device and a second exhaust-gas cleaning device.

As illustrated in FIGS. 1 and 2, the motor unit 9 is provided with an engine compartment 15. The engine compartment 15 is formed by an engine bonnet 16, which covers the engine compartment 15 from above and the front; a partition member (i.e., the partition) 17 that forms a partition between the engine compartment 15 and the driving unit 12; and the like.

As illustrated in FIGS. 1 and 2, the engine 5, a radiator 18 that cools the engine 5, and a first exhaust-gas cleaning device (DPF) 21 and second exhaust-gas cleaning device (SCR) 22 that perform cleaning processes of exhaust gas exhausted by the engine 5 are provided in the engine compartment 15.

[Configuration of Radiator]

As illustrated in FIG. 1, the radiator 18 is provided in front of the engine 5. A blowing action of a rotary fan 19 positioned between the radiator 18 and the engine 5 introduces cooling air from outside the engine compartment 15 to inside the engine compartment and supplies the cooling air to the radiator 18. The cooling air is supplied to the radiator 18 in a state of the cooling air passing through the radiator 18 from front to back. In the radiator 18, engine cooling water is cooled by heat exchange between the supplied cooling air and the engine cooling water. The engine 5 is cooled by the cooled engine cooling water being supplied to the engine 5.

[Configurations of First Exhaust-Gas Cleaning Device and Second Exhaust-Gas Cleaning Device]

Figure 3:
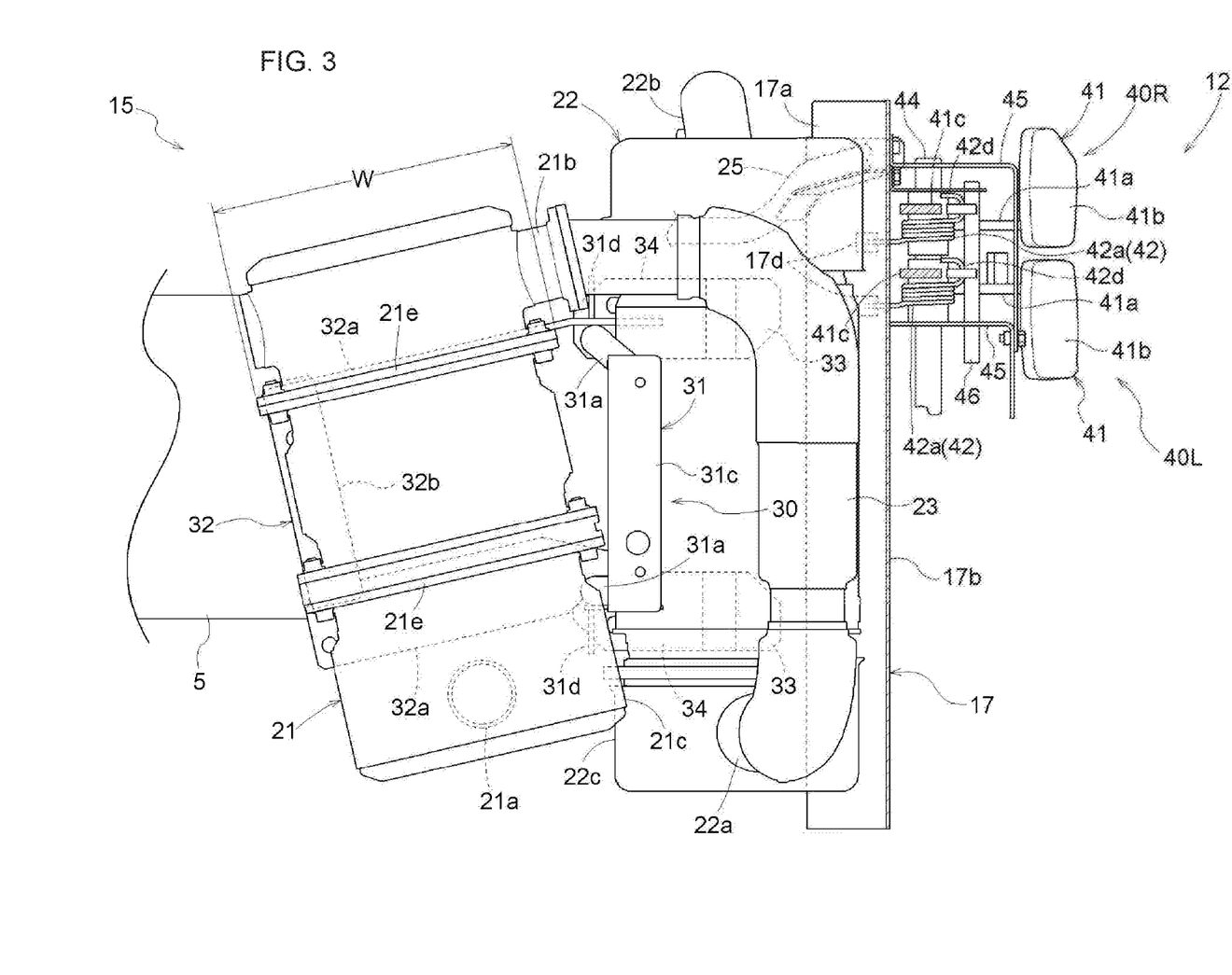
FIG. 3 is a plan view illustrating the first exhaust-gas cleaning device and the second exhaust-gas cleaning device.

The engine 5 is a diesel engine. As illustrated in FIGS. 2 and 3, the first exhaust-gas cleaning device 21 is provided above the engine 5 in a state where a long side of the first exhaust-gas cleaning device is substantially parallel to a vehicle-body lateral width direction. A maximum length H in a vehicle-body vertical direction of the first exhaust-gas cleaning device 21 is set to be shorter than a maximum length W in a vehicle-body longitudinal direction of the first exhaust-gas cleaning device 21. As illustrated in FIGS. 2 and 3, an exhaust-gas suction portion (i.e., the exhaust-gas suction pipe) 21a, which is provided to a part on one end side, in a vehicle-body lateral width direction, of the first exhaust-gas cleaning devices 21, and an exhaust-gas exhausting portion 5a, which is provided to the engine 5, are connected. An exhaust-gas discharge portion (i.e., the exhaust-gas discharge pipe) 21b is provided to a part on another end side, in the vehicle-body lateral width direction, of the first exhaust-gas cleaning device 21. In one or more embodiments, the exhaust-gas suction portion 21a protrudes downward from a lower portion of the first exhaust-gas cleaning device 21 at an end portion on a vehicle-body left horizontal side of the first exhaust-gas cleaning device 21, and the exhaust-gas discharge portion 21b protrudes backward from an end portion on a vehicle-body right horizontal side of the first exhaust-gas cleaning device 21.

In the first exhaust-gas cleaning device 21, the exhaust gas exhausted by the engine 5 from the exhaust-gas exhausting portion 5a is suctioned by the exhaust-gas suction portion 21a into the apparatus, and diesel microparticles included in the suctioned exhaust gas are collected by a collection filter (not illustrated). This performs an exhaust-gas cleaning process of decreasing the diesel microparticles. The exhaust gas subjected to the cleaning process is discharged from the exhaust-gas discharge portion 21b.

As illustrated in FIGS. 2 and 3, the second exhaust-gas cleaning device 22 is provided behind the engine 5 in a state where a long side of the second exhaust-gas cleaning device is substantially parallel to the vehicle-body lateral width direction. An exhaust-gas introduction portion (i.e., the exhaust-gas introduction pipe) 22a, which is provided to a part on one end side, in the vehicle-body lateral width direction, of the second exhaust-gas cleaning device 22, and the exhaust-gas discharge portion 21b of the first exhaust-gas cleaning device 21 are connected by a connecting pipe 23. An exhaust-gas discharge portion (i.e., the exhaust-gas discharge pipe) 22b is provided to a part on another end side, in the vehicle-body lateral width direction, of the second exhaust-gas cleaning device 22. In one or more embodiments, the exhaust-gas introduction portion 22a is provided to an end portion on a vehicle-body left horizontal side of the second exhaust-gas cleaning device 22, and the exhaust-gas discharge portion 22b is provided to an end portion on a vehicle-body right horizontal side of the second exhaust-gas cleaning device 22.

In the second exhaust-gas cleaning device 22, the exhaust gas discharged by the first exhaust-gas cleaning device 21 from the exhaust-gas discharge portion 21b is supplied by the connecting pipe 23 to the exhaust-gas introduction portion 22a and introduced by the exhaust-gas introduction portion 22a into the apparatus, and the introduced exhaust gas is subjected to the cleaning process by a reducing agent. Specifically, aqueous urea as the reducing agent is injected into the introduced exhaust gas, hydrolyzing the exhaust gas. This performs an exhaust-gas cleaning process of decreasing nitrogen oxides included in the exhaust gas. The exhaust gas subjected to the cleaning process is exhausted from the exhaust-gas discharge portion 22b to a vehicle-body horizontal outer side.

As illustrated in FIG. 3, the first exhaust-gas cleaning device 21 is supported in an attachment disposition wherein the part on the other end side, in the vehicle-body lateral width direction, is swung and displaced toward a vehicle-body front side with respect to the part on the one end side, in the vehicle-body lateral width direction, in a state where the exhaust-gas suction portion 21a is the center of the swinging. That is, the first exhaust-gas cleaning device 21 is supported in a disposition wherein in a plan view, the long side thereof is inclined relative to the vehicle-body lateral width direction. As illustrated in FIG. 2, the exhaust-gas introduction portion 22a of the second exhaust-gas cleaning device 22 extends diagonally backward and upward from the second exhaust-gas cleaning device 22. A positional relationship between the exhaust-gas discharge portion 21b of the first exhaust-gas cleaning device 21 and the exhaust-gas introduction portion 22a of the second exhaust-gas cleaning device 22 can be made to be a positional relationship appropriate for adopting a connecting pipe 23 having no bellows or other adjustment means of adjusting the positional relationship between the exhaust-gas discharge portion 21b and the exhaust-gas introduction portion 22a. This can be done by bringing the first exhaust-gas cleaning device 21 and the second exhaust-gas cleaning device 22 in proximity to each other in the vehicle-body longitudinal direction and by directly connecting the exhaust-gas suction portion 21a of the first exhaust-gas cleaning device 21 to the exhaust-gas exhausting portion 5a of the engine 5.

As illustrated in FIGS. 2 and 3, a back portion 21c of the first exhaust-gas cleaning device 21 is positioned on a back side of a back end portion of the engine 5. In a plan view, the back portion 21c of the first exhaust-gas cleaning device 21 and the second exhaust-gas cleaning device 22 overlap.

As illustrated in FIGS. 2 and 3, the partition member 17 that forms the partition between the engine compartment 15 and the driving unit 12 is provided across a back location of the second exhaust-gas cleaning device 22 and a lower location of the second exhaust-gas cleaning device 22. The partition member 17 is configured so a part 17a—positioned in the lower location of the second exhaust-gas cleaning device 22—of the partition member 17 is positioned further toward a vehicle-body front side than a part 17b—positioned in the back location of the second exhaust-gas cleaning device 22—of the partition member 17. The part 17a—positioned in the lower location of the second exhaust-gas cleaning devices 22—of the partition member 17 is provided with a portion in an inclined state that, in moving toward its lower end side, is positioned more to a vehicle-body front side. A footwell of the driving unit 12 can be extended below the second exhaust-gas cleaning device 22.

Figure 6:
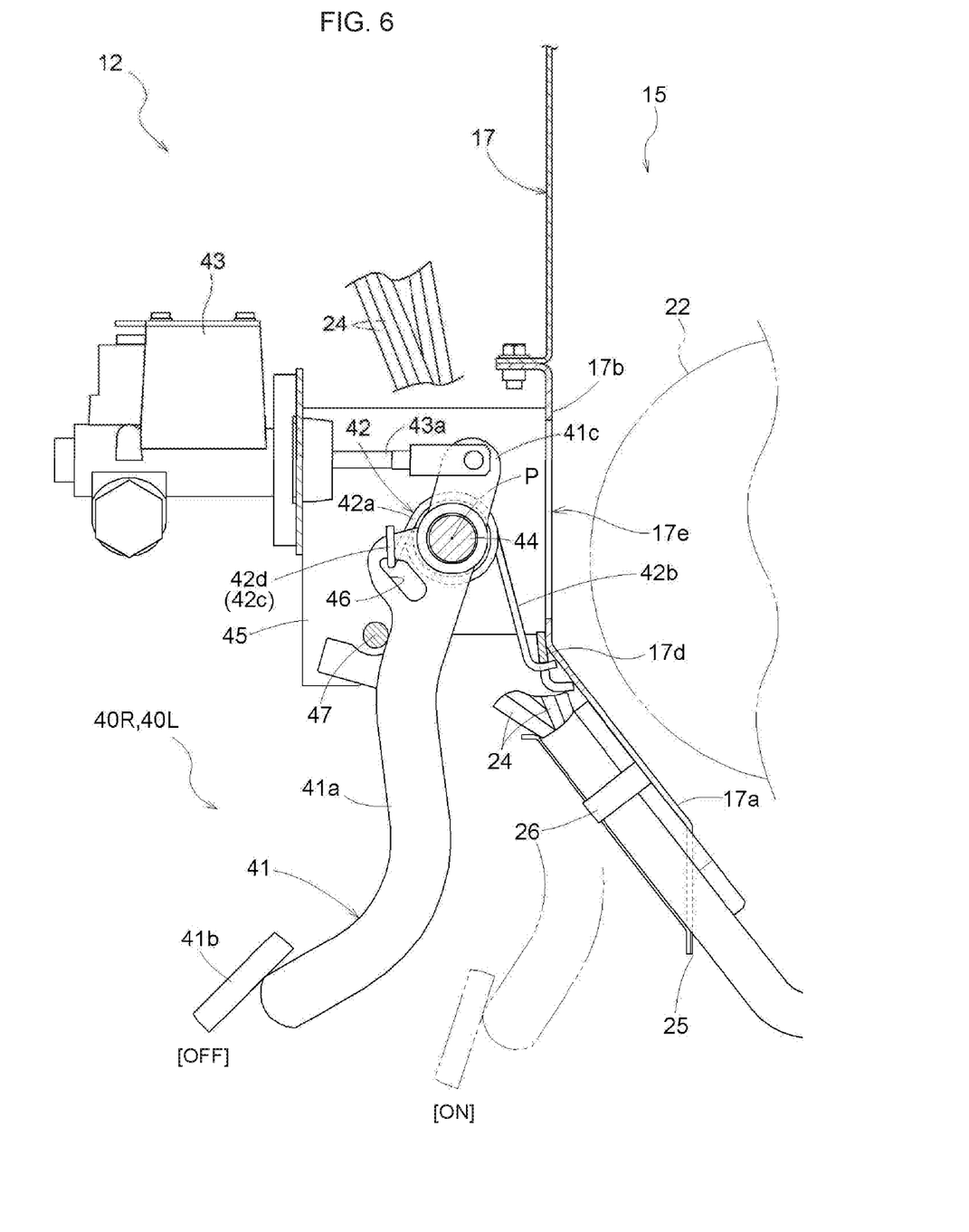
FIG. 6 is a right side view illustrating left and right brake operation devices.

As illustrated in FIG. 6, electrical wires 24 are provided across the engine compartment 15 and the driving unit 12. In one or more embodiments, a plurality of electrical wires 24 is provided. However, it is also possible for only one to be provided. The electrical wires 24 enter from the engine compartment 15 into the footwell of the driving unit 12 by passing below a part positioned in a central portion in the vehicle-body lateral width direction of the partition member 17. The electrical wires 24 transmit information relating to actuation of the engine 5 to gauges of the driving unit 12. A portion of the electrical wires 24 that is positioned on a driving-unit side of the partition member 17 is wired in a state of conforming to the part 17*a*—positioned in the lower location of the second exhaust-gas cleaning devices 22—of the partition member 17 in the footwell of the driving unit 12. The electrical wires 24 pass through a conduit 25. The conduit 25 is supported on the partition member 17 by a clamp 26.

[Support Member of Exhaust-Gas Cleaning Devices]

Figure 4:
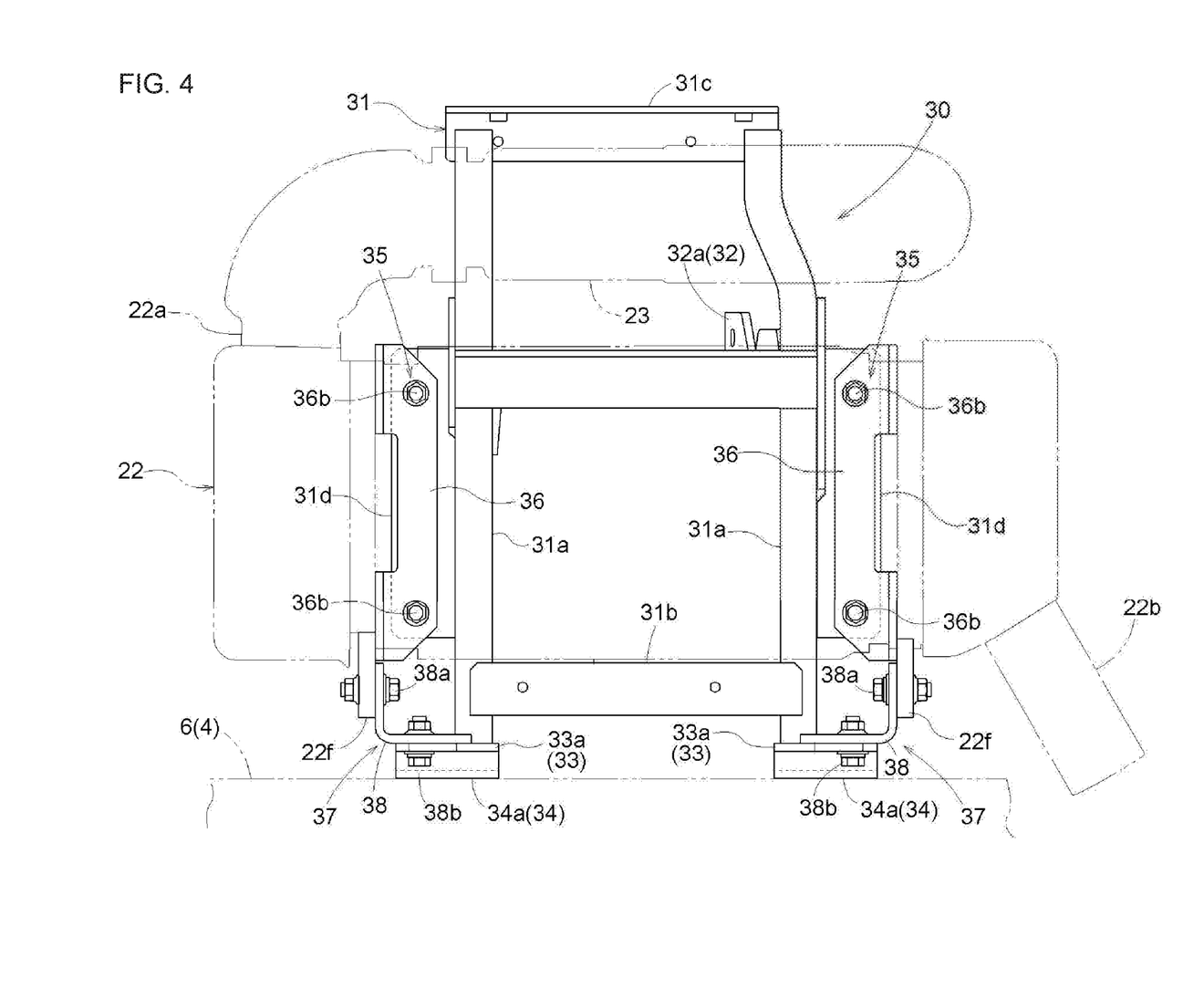
FIG. 4 is a back view illustrating a support member.

As illustrated in FIGS. 2, 3, and 4, the first exhaust-gas cleaning device 21 and the second exhaust-gas cleaning device 22 are supported on the vehicle body frame 4 via a support member 30. The first exhaust-gas cleaning device 21 and the second exhaust-gas cleaning device 22 are supported by the vehicle body frame 4 in a state where the positional relationship between the exhaust-gas discharge portion 21*b* of the first exhaust-gas cleaning device 21 and the exhaust-gas introduction portion 22*a* of the second exhaust-gas cleaning device 22 is set by the support member 30.

As illustrated in FIGS. 2, 3, 4, and 5, the support member 30 is provided with a strut portion 31 that extends upward from the vehicle body frame 4 in a state of conforming to a front portion 22*c* of the second exhaust-gas cleaning device 22 and supports the front portion 22*c* of the second exhaust-gas cleaning device 22, a support arm portion 32 that extends in a vehicle-body forward direction from an upper portion of the strut portion 31 in a state of conforming to a lower portion 21*d* of the first exhaust-gas cleaning device 21 and supports the lower portion 21*d* of the first exhaust-gas cleaning device 21, and a lower support portion 33 that is provided to a lower portion of the strut portion 31 and supports a lower portion 22*d* of the second exhaust-gas cleaning device 22.

Figure 5:
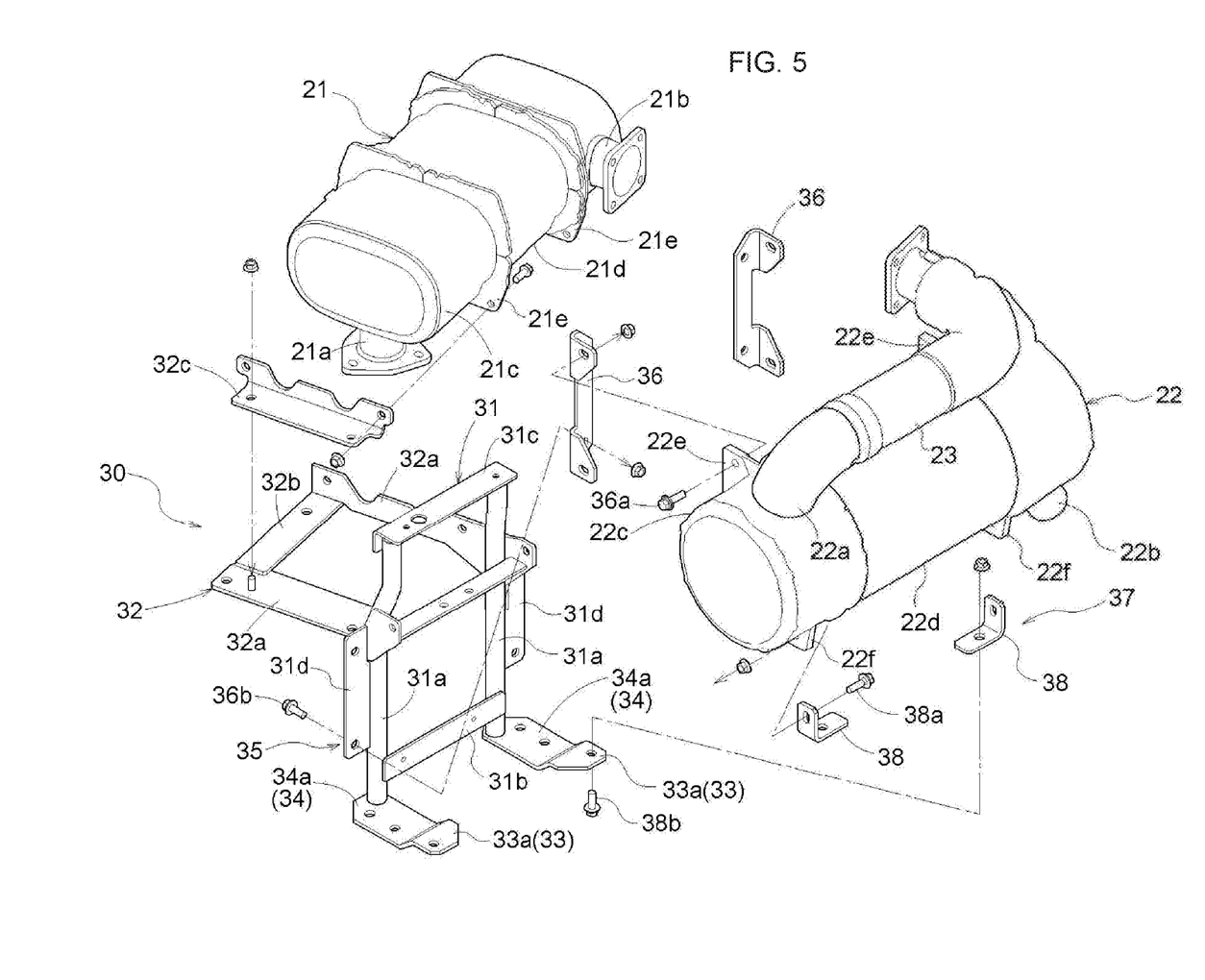
FIG. 5 is a perspective view of the support member in an exploded state.

As illustrated in FIGS. 2, 4, and 5, the strut portion 31 has a washer portion 34 provided to the lower portion of the strut portion 31 and is supported on the vehicle body frame 4 by the washer portion 34 being connected to the vehicle body frame 4. The connection of the washer portion 34 to the vehicle body frame 4 is performed by the flywheel housing 6 constituting the vehicle body frame 4. The flywheel housing 6 is positioned below the second exhaust-gas cleaning device 22 and can keep a length of the strut portion 31 short.

As illustrated in FIGS. 2, 4, and 5, the strut portion 31 is provided with left and right strut rods 31*a* lined up at an interval in the vehicle-body lateral width direction. A lower strut-portion reinforcing rod 31*b*, which connects lower portions of the strut rods 31*a*, and an upper strut-portion reinforcing rod 31*c*, which connects upper portions of the strut rods 31*a*, are provided across the left and right strut rods 31*a*. The left and right strut rods 31*a* are constituted by steel pipes.

As illustrated in FIGS. 2, 4, and 5, a front support portion 31*d* supporting the second exhaust-gas cleaning device 22 is provided to each of the left and right strut rods 31*a*. The front portion 22*c* of the second exhaust-gas cleaning device 22 is supported by the strut portion 31 by front connecting portions 22*e*—provided in two locations, left and right, in the front portion 22*c* of the second exhaust-gas cleaning device 22—being connected to the front support portion 31*d*.

As illustrated in FIGS. 2, 4, and 5, washer plates 34*a* provided to respective lower portions of the left and right strut rods 31*a* are provided to the washer portion 34. In the washer portion 34, the left and right washer plates 34*a* being connected to the flywheel housing 6 by a plurality of connecting bolts provides a detachable connection to the flywheel housing 6.

As illustrated in FIGS. 2, 4, and 5, the lower support portion 33 is provided with lower support pieces 33*a* provided to the lower portions of the left and right strut rods 31*a*. The left and right lower support pieces 33*a* are provided to the strut rods 31*a* by being formed on the washer plates 34*a*. The lower support portion 33 is provided to the washer portion 34. The lower portion 22*d* of the second exhaust-gas cleaning device 22 is supported by the lower support portion 33 by lower connecting portions 22*f*—provided in two locations, left and right, in the lower portion 22*d* of the second exhaust-gas cleaning device 22—being connected to the lower support pieces 33*a*.

As illustrated in FIGS. 2, 4, and 5, the support arm portion 32 is provided with arm bodies 32*a* that extend in the vehicle-body forward direction from respective upper portions of the left and right strut rods 31*a*. An arm reinforcing rod 32*b* connecting the left and right arm bodies 32*a* is provided across distal end portions of the left and right arm bodies 32*a*. Among the left and right arm bodies 32*a*, the left arm body 32*a* is configured to connect via a relay member 32*c* to a lower connecting portion 21*e* provided to the lower portion 21*d* of the first exhaust-gas cleaning device 21. The right arm body 32*a* is configured to connect directly to the lower connecting portion 21*e* of the first exhaust-gas cleaning device 21.

[Configuration of Position Adjustment of Exhaust-Gas Cleaning Devices]

As illustrated in FIGS. 2, 4, and 5, the support member 30 is provided with a position adjustment portion 35 that can adjust a support position—in the vehicle-body vertical direction, the vehicle-body longitudinal direction, and the vehicle-body lateral width direction—of the second exhaust-gas cleaning device 22 on the strut portion 31 and with a second position adjustment portion 37 that can adjust a support position—in the vehicle-body vertical direction, the vehicle-body longitudinal direction, and the vehicle-body lateral width direction—of the second exhaust-gas cleaning device 22 on the lower support portion 33.

When there is a position shift between the exhaust-gas discharge portion 21*b* of the first exhaust-gas cleaning device 21 and the exhaust-gas introduction portion 22*a* of the second exhaust-gas cleaning device 22, so the positional relationship between the exhaust-gas discharge portion 21*b* and the exhaust-gas introduction portion 22*a* becomes appropriate and the exhaust-gas discharge portion 21*b* and the exhaust-gas introduction portion 22*a* can be appropriately connected by the connecting pipe 23 having no position adjustment function, the positional relationship between the exhaust-gas discharge portion 21*b* and the exhaust-gas introduction portion 22*a* can be adjusted by the position adjustment portion 35 and the second position adjustment portion 37.

Specifically, as illustrated in FIGS. 2, 4, and 5, the position adjustment portion 35 is provided with an adjustment member 36 positioned between the front connection portion 22*e* of the second exhaust-gas cleaning device 22 and the front support portion 31*d* of the strut portion 31, a first connecting bolt 36*a* connecting the front connecting portion 22*e* and the adjustment member 36, and a second connecting bolt 36*b* connecting the front support portion 31*d* and the adjustment member 36.

As illustrated in FIGS. 2, 4, and 5, the second position adjustment portion 37 is provided with a second adjustment member 38 positioned between the lower connecting portion 22*f* of the second exhaust-gas cleaning device 22 and the lower support piece 33*a* of the strut portion 31, a third connecting bolt 38*a* connecting the lower connecting portion 22*f* and the second adjustment member 38, and a fourth connecting bolt 38*b* connecting the lower support piece 33*a* and the second adjustment member 38.

A hole diameter of a through hole (not illustrated) of the adjustment member 36 into which the first connecting bolt 36*a* is inserted is made greater than an outer diameter of the first connecting bolt 36*a* for a configuration enabling position shifting of the front connecting portion 22*e* relative to the adjustment member 36. A through hole (not illustrated) of the position adjustment member 36 into which the second connecting bolt 36*b* is inserted is made greater than an outer diameter of the second connecting bolt 36*b* for a configuration enabling position shifting of the adjustment member 36 relative to the front support portion 31*d*.

A hole diameter of a through hole (not illustrated) of the second adjustment member 38 into which the third bolt 38*a* is inserted is made greater than an outer diameter of the third connecting bolt 38*a* for a configuration enabling position shifting of the adjustment member 36 relative to the front support portion 31*d*. A hole diameter of a through hole (not illustrated) of the second adjustment member 38 into which the fourth connecting bolt 38*b* is inserted is made greater than an outer diameter of the fourth connecting bolt 38*b* for a configuration enabling position shifting of the adjustment member 36 relative to the front support portion 31*d*.

In the position adjustment portion 35, among the first connecting bolt 36*a*, the second connecting bolt 36*b*, the third connecting bolt 38*a*, and the fourth connecting bolt 38*b*, tightening of a connecting bolt corresponding to desired position adjustment is loosened. Performing an operation of moving the second exhaust-gas cleaning device 22 shifts the position of the second exhaust-gas cleaning devices 22 relative to the support member 30. This changes the support position—in the vehicle-body vertical direction, the vehicle-body longitudinal direction, and the vehicle-body lateral width direction—of the second exhaust-gas cleaning device 22 on the strut portion 31 in a manner corresponding to the operation that is performed of moving the second exhaust-gas cleaning device 22.

In the second position adjustment portion 37, among the first connecting bolt 36*a*, the second connecting bolt 36*b*, the third connecting bolt 38*a*, and the fourth connecting bolt 38*b*, tightening of a connecting bolt corresponding to desired position adjustment is loosened. Performing an operation of moving the second exhaust-gas cleaning device 22 shifts the position of the second exhaust-gas cleaning device 22 relative to the support member 30. This changes the support position—in the vehicle-body vertical direction, the vehicle-body longitudinal direction, and the vehicle-body lateral width direction—of the second exhaust-gas cleaning device 22 on the lower support portion 33 in a manner corresponding to the operation that is performed of moving the second exhaust-gas cleaning device 22.

[Configuration of Driving Unit]

Figure 8:
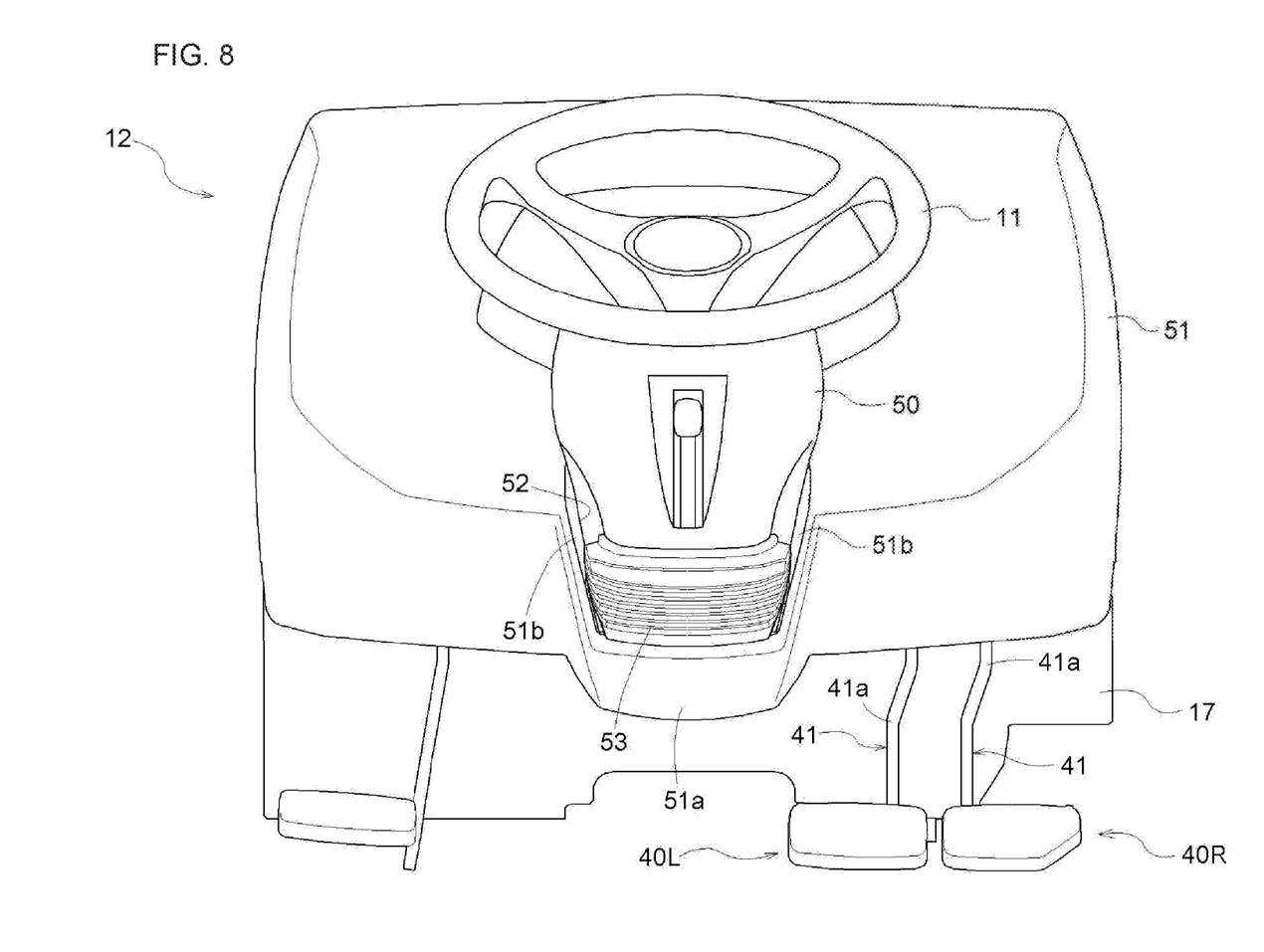
FIG. 8 is a back view illustrating a steering-post cover and a panel cover.

As illustrated in FIG. 1, the driving unit 12 is provided behind the engine compartment 15. As illustrated in FIGS. 1, 3, and 8, the driving unit 12 is provided with the driver's seat 10, the steering wheel 11 whereby the steering operation of the front wheels 1 is performed, a left brake operation unit 40L whereby brakes (not illustrated) for the left back wheel are operated, and a right brake operation unit 40R whereby brakes (not illustrated) for the right back wheel are operated.

[Configurations of Left Brake Operation Unit and Right Brake Operation Unit]

As illustrated in FIG. 8, the left brake operation unit 40L and the right brake operation unit 40R are provided to the right and below the steering wheel 11. As illustrated in FIGS. 3, 6, and 8, the left brake operation unit 40L and the right brake operation unit 40R are each provided with a brake pedal 41, a return spring 42 that subjects the brake pedal 41 to an operation of being returned to an initial position ("off"), and a master cylinder 43 connected to the brake pedal 41.

As illustrated in FIG. 6, the brake pedal 41 is provided with a pedal arm portion 41*a* and with a footboard portion 41*b* provided at a lower end portion of the pedal arm portion 41*a*. A support shaft 44 is provided at an upper portion of the pedal arm portion 41*a*. The support shaft 44 is supported by a support portion 45 provided to the traveling vehicle body 3. The brake pedal 41 is supported on the traveling vehicle body 3 in a state of being able to swing between the initial position ("off") and a braking position ("on") by using a shaft core P of the support shaft 44 as a swinging fulcrum. The brake pedal 41 is positioned to the initial position ("off") by the pedal arm portion 41*a* abutting a stopper 47.

As illustrated in FIG. 6, the partition member 17 forming the partition between the engine compartment 15 and the driving unit 12 is disposed further toward a vehicle-body front side than the brake pedal 41. The return spring 42 is engaged to the pedal arm portion 41*a* and a spring support portion 17*d* provided to the partition member 17. The return spring 42 biases the brake pedal 41 to swing to the initial position ("off") by using the partition member 17 as a reaction-force member.

As illustrated in FIG. 6, the partition member 17 is configured so the part 17*a*, which corresponds to the footboard portion 41*b*, of the partition member 17 is positioned further toward a vehicle-body front side than the part 17*b*, corresponding to the support shaft 44, of the partition member 17. A front portion of the footwell of the driving unit 12 can be extended forward past the support shaft 44.

As illustrated in FIG. 6, the master cylinder 43 is provided on a vehicle-body back side of the support shaft 44 of the brake pedal 41. The master cylinder 43 is fixed in a detachable manner to the support portion 45. A slidable operation shaft 43*a* of the master cylinder 43 and an operation arm portion 41*c* provided to the brake pedal 41 are interconnected. The operation arm portion 41*c* extends from the pedal arm portion 41*a* toward an opposite side of a side whereon the footboard portion 41*b* is positioned relative to the support shaft 44.

In both the left brake operation unit 40L and the right brake operation unit 40R, when the brake pedal 41 is subjected to a stepping operation against the return spring 42 and enters the braking position ("on"), the operation shaft 43*a* of the master cylinder 43 is subjected to a sliding operation to a pushed-in side by the operation arm portion 41*c*. The master cylinder 43 supplies operational hydraulic pressure to the brakes (not illustrated), and the brakes perform an operation of switching to a braking state. When the stepping operation of the brake pedal 41 is released, the brake pedal 41 is subjected to an operation of returning to the initial position ("off") by the return spring 42, and the operation shaft 43*a* of the master cylinder 43 is subjected to a sliding operation to a pulled-out side by the operation arm 41*c*. The imparting of the operational hydraulic pressure by the master cylinder 43 to the brakes is released, and the brakes perform an operation of switching to an initial state.

[Configuration of Return Spring]

As illustrated in FIGS. 3 and 6, the return spring 42 is constituted by a torsion coil spring and is provided with a coil portion 42a, an arm portion 42b extending from one end side of the coil portion 42a, and an arm portion 42c extending from another end side of the coil portion 42a. The coil portion 42a is fitted onto the support shaft 44, and the return spring 42 is supported by the support shaft 44. The arm portion 42b on the one end side is engaged to the spring support portion 17d of the partition member 17. The arm portion 42c on the other end side is engaged to the pedal arm portion 41a.

As illustrated in FIG. 6, a bent end portion 42d engaged to the pedal arm portion 41a is provided to the arm portion 42c on the other end side. A through hole 46 whereto the bent end portion 42d is engaged is provided to the pedal arm portion 41a. A shape of the through hole 46 is made to be a shape into which the bent end portion 42d, which moves along the shaft core P of the support shaft 44, can be inserted. The return spring 42 and the brake pedal 41 can be assembled by the following assembly outline.

Figure 7:
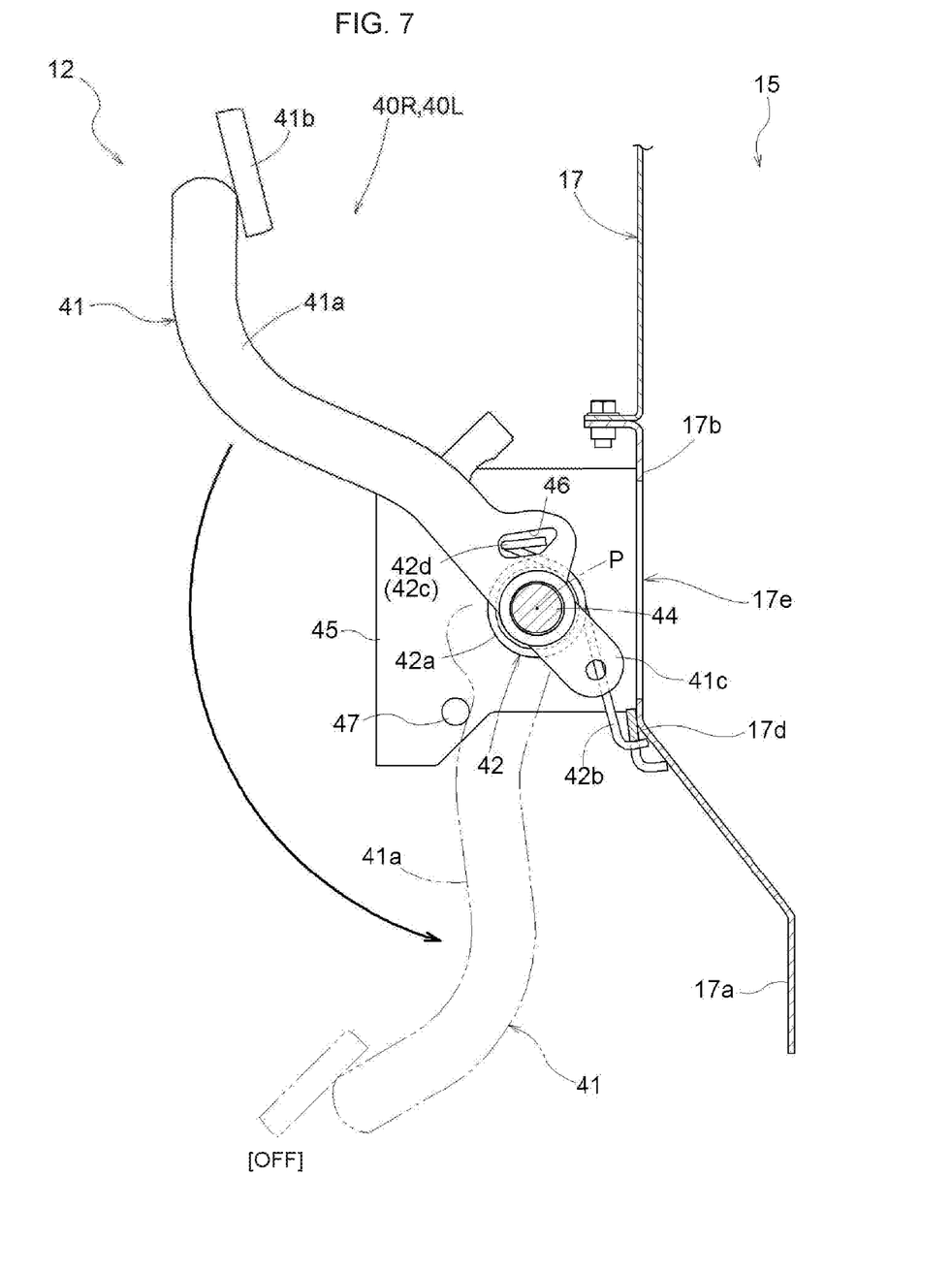
FIG. 7 is an explanatory diagram illustrating a summary of assembly of the brake pedal.

As illustrated in FIG. 7, the coil portion 42a fits the return spring 42 onto the support shaft 44, and the arm portion 42b on the one end side is placed in a state of being engaged to the partition member 17. The return spring 42 is in a free state. The stopper 47 is removed from the support portion 45. The brake pedal 41 is attached to the support shaft 44 and swung up, and the brake pedal 41 is biased to oppose the support shaft, wherein the footboard portion 41b is positioned in a position higher than when the brake pedal 41 is positioned in the initial position ("off"). The brake pedal 41 in this disposition of opposing the support shaft is guided to the support shaft 44 and moved toward the return spring 42. By moving the brake pedal 41, the bent end portion 42d of the return spring 42 moves toward the pedal arm portion 41a in a direction along the shaft core p of the support shaft 44, is inserted into the through hole 46 from an inner side of the pedal arm portion 41a, and moves to an outer side of the pedal arm portion 41a. Next, the brake pedal 41 is swung downward. At this time, the operation arm portion 41c enters a slit 17e provided in the partition member 17. The stopper 47 is attached to the support portion 45, and the brake pedal 41 is moved to the initial position ("off"). This causes the brake pedal 41 to be stopped by the stopper 47. As illustrated in FIG. 6, the bent end portion 42d engages to the pedal arm portion 41a, the return spring 42 is provided with an elastic restoring force, and the brake pedal 41 enters a state of being biased and swung to the initial position ("off") by the return spring 42. The slit 17e is closed off once assembly of the brake pedal 41 is finished.

[Configurations of Steering-Post Cover and Panel Cover]

The steering wheel 11 is supported in a state of being able to change positions in the vehicle-body front-back direction and the vehicle-body up-down direction. As illustrated in FIG. 8, a steering-post cover 50 is inserted into a through hole 52 of a panel cover 51 supported on the traveling vehicle body 3. When the steering wheel 11 changes positions in the vehicle-body front-back direction, the steering-post cover 50 follows the steering wheel 11 and swings in the vehicle-body front-back direction relative to the panel cover 51. A bellows-shaped expandable cover 53 is connected across a proximal-side lower portion of the steering-post cover 50 and a lower portion 51a of the panel cover 51. The expandable cover 53 expands and contracts according to the swinging of the steering-post cover 50 but, regardless of the swinging of the steering-post cover 50, places a gap between the steering-post cover 50 and the lower portion 51a of the panel cover 51 in a closed state. Between a part opposing a distal-side wall portion of the steering-post cover 50 of the panel cover 51 and the distal-side wall portion of the steering-post cover 50, a gap that allows the steering-post cover 50 to swing is provided. However, above the gap and on the distal-side wall portion of the steering-post cover 50, a bulging portion that bulges toward a cover outer side and makes the gap difficult to see from above is provided. In the panel cover 51, a face portion 51b corresponding to a side portion of the steering-post cover 50 is raised to the proximal side. Even if the steering-post cover 50 swings, the face portion 51b makes it difficult to see the gap between the steering-post cover 50 and the panel cover 51 on a horizontal side of the steering-post cover 50.

Figure 9:
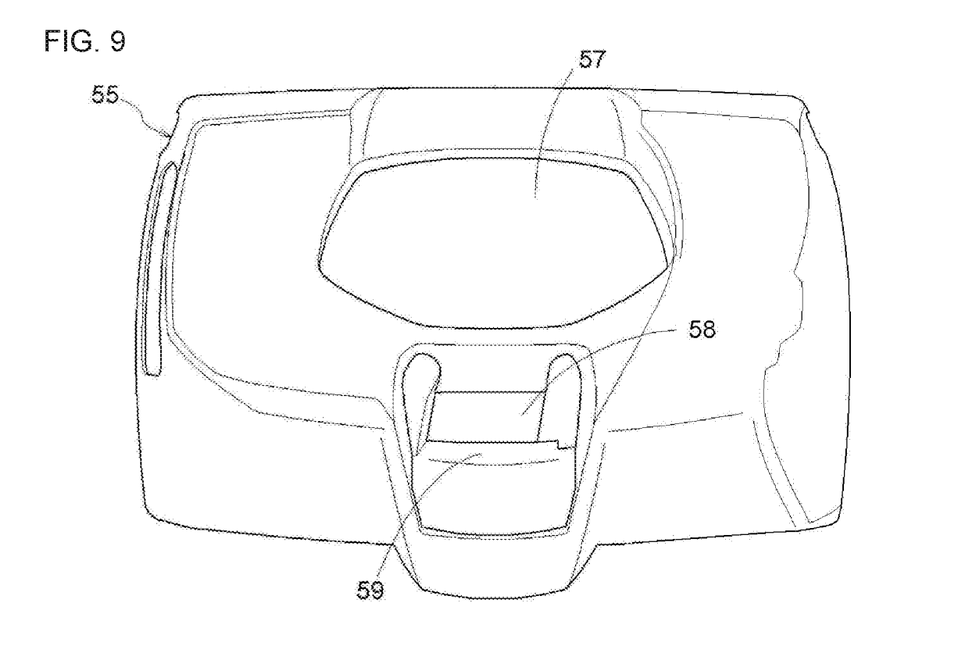
FIG. 9 is a back view of a panel cover provided with another example of one or more embodiments.
Figure 10:
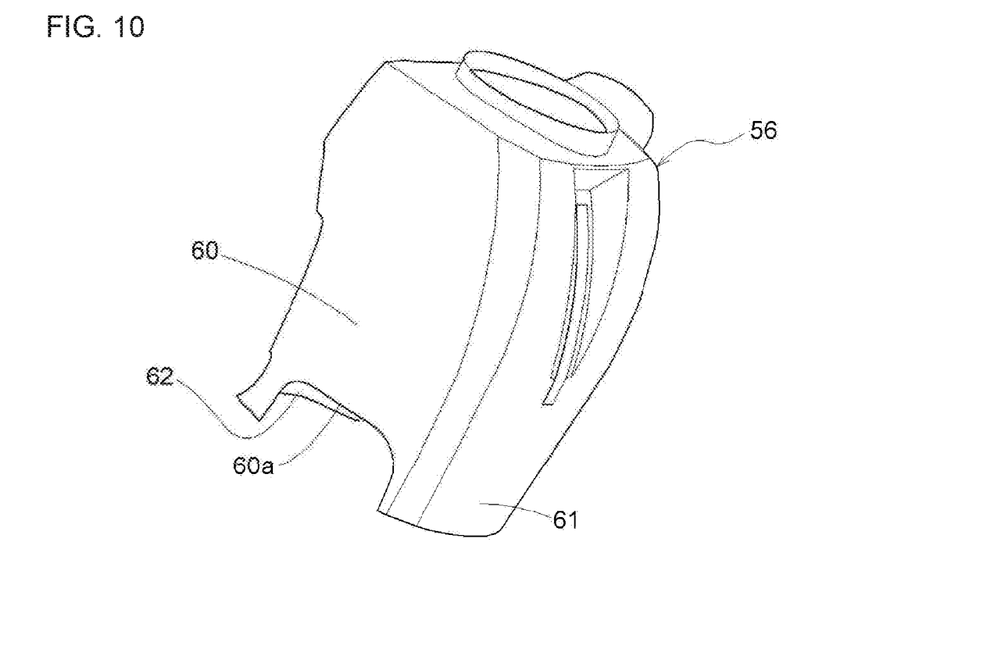
FIG. 10 is a perspective view of a steering-post cover provided with another example of one or more embodiments.

Other Embodiments (1) FIG. 9 is a back view of a panel cover 55 provided with another example of one or more embodiments. FIG. 10 is a perspective view of a steering post cover 56 provided with another example of one or more embodiments. In the panel cover 55 provided with another example, below a through hole 57 into which the steering-post cover 56 is inserted, an opening 58 and a proximal wall 59 extending upward from a lower edge portion of the opening 58 are provided. In the steering-post cover 56, on a proximal-side lower portion, a proximal extended portion 61 that extends lower than a lower end 60a of a horizontal wall portion 60 is provided, and on a distal-side lower portion, a distal extended portion 62 that extends lower than the lower end 60a of the horizontal wall portion 60 is provided. The proximal wall 59, the proximal extended portion 61, and the distal extended portion 62 serve as hiding walls that make it difficult to see into an area below the panel cover 55 via a gap arising between the steering-post cover 56 and the panel cover 55 on a proximal side and horizontal side of the steering-post cover 56.

(2) In the embodiments described above, an example is given wherein the exhaust-gas introduction portion 22a is extended in a back oblique upward direction from the second exhaust-gas cleaning device 22, but the present invention is not limited thereto. For example, it may extend directly upward from the second exhaust-gas cleaning device 22 or obliquely forward.

(3) In the embodiments described above, an example was given wherein the first exhaust-gas cleaning device 21 is supported in an attachment disposition wherein the part on the other end side, in the vehicle-body lateral width direction, is swung and displaced toward a vehicle-body front side with respect to the part on the one end side, in the vehicle-body lateral width direction, in a state where the exhaust-gas suction portion 21a is the center of the swinging, but the present invention is not limited thereto. The first exhaust-gas cleaning device 21 may have a mounting disposition that does not displace in the vehicle-body longitudinal direction a portion on the other end side in the vehicle-body lateral width direction with respect to one end side in the vehicle-body lateral width direction.

(4) In the embodiments described above, an example is given wherein the back portion 21c of the first exhaust-gas cleaning device 21 and the second exhaust-gas cleaning device 22 overlap in a plan view, but these need not overlap.

(5) In the embodiments described above, an example is given wherein the partition member 17 is configured so the part 17a positioned in the lower location of the second exhaust-gas cleaning device 22 is positioned further toward a vehicle-body front side than the part 17b positioned in the back location of the second exhaust-gas cleaning device 22. For example, the portion 17a positioned below the second exhaust-gas cleaning device 22 and the portion 17b positioned behind the second exhaust-gas cleaning device 22 are positioned at the same position in the vehicle-body longitudinal direction; alternatively, the portion 17a located below the second exhaust-gas cleaning device 22 may be located further to the back side of the vehicle body than the portion 17b located behind the second exhaust-gas cleaning device 22.

(6) In the above embodiments, an example was given wherein the electrical wires 24 were configured to follow the portion 17a of the partition member 17 located below the second exhaust-gas cleaning device 22, but the present invention is not limited thereto, and the partition member 17 need not be provided with electrical wires on the driving unit side, or the electrical wires may be wired in any way.

INDUSTRIAL APPLICABILITY

One or more embodiments of the present invention can be applied to a tractor provided with an engine bonnet forming an engine compartment.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:
1. A tractor comprising:
a vehicle body;
an engine bonnet that forms an engine compartment;
an engine that is disposed in the engine compartment;
a first exhaust-gas cleaning device that is disposed in the engine compartment and cleans exhaust gas discharged by the engine; and
a second exhaust-gas cleaning device that is disposed in the engine compartment and cleans the exhaust gas, wherein
the first exhaust-gas cleaning device is smaller than the second exhaust-gas cleaning device,
the first exhaust-gas cleaning device is disposed above the engine such that a long side of the first exhaust-gas cleaning device is substantially parallel to a vehicle-body lateral width direction,
the second exhaust-gas cleaning device is disposed behind the engine with respect to a vehicle-body front side such that a long side of the second exhaust-gas cleaning device is substantially parallel to the vehicle-body lateral width direction; and
a maximum length of the first exhaust-gas cleaning device in a vehicle-body vertical direction is shorter than a maximum length of the first exhaust-gas cleaning device in a vehicle-body longitudinal direction.
2. The tractor according to claim 1, wherein
the second exhaust-gas cleaning device comprises:
an exhaust-gas introduction pipe that introduces exhaust gas discharged by the first exhaust-gas cleaning device into the second exhaust-gas cleaning device, and
the exhaust-gas introduction pipe extends backward and obliquely upward from the second exhaust-gas cleaning device.

3. The tractor according to claim 1, wherein
the first exhaust-gas cleaning device comprises:
an exhaust-gas suction pipe that sucks the exhaust gas from the engine into the first exhaust-gas cleaning device and is disposed at one end side of the first exhaust-gas cleaning device in the vehicle-body lateral width direction, and
an exhaust-gas discharging pipe that discharges exhaust gas toward the second exhaust-gas cleaning device and is disposed at another end side of the first exhaust-gas cleaning device in the vehicle-body lateral width direction, and
the first exhaust-gas cleaning device is attached to the engine in a state where a lateral-end portion of the first exhaust-gas cleaning device is swung and displaced toward the vehicle-body front side with respect to another lateral-end portion of the first exhaust-gas cleaning device with the exhaust-gas suction pipe as a swinging shaft.
4. The tractor according to claim 1, wherein
a back portion of the first exhaust-gas cleaning device overlaps the second exhaust-gas cleaning device in a plan view.
5. The tractor according to claim 1, further comprising:
a driving unit located behind the engine compartment; and
a partition that separates the engine compartment from the driving unit and extends between a back location of the second exhaust-gas cleaning device and a lower location of the second exhaust-gas cleaning device, wherein
a portion of the partition positioned at the lower location is positioned further to the vehicle-body front side than a portion of the partition positioned at the back location.
6. A tractor comprising:
a vehicle body;
an engine bonnet that forms an engine compartment;
an engine that is disposed in the engine compartment;
a first exhaust-gas cleaning device that is disposed in the engine compartment and cleans exhaust gas discharged by the engine; and
a second exhaust-gas cleaning device that is disposed in the engine compartment and cleans the exhaust gas, wherein
the first exhaust-gas cleaning device is disposed above the engine such that a long side of the first exhaust-gas cleaning device is substantially parallel to a vehicle-body lateral width direction,
the second exhaust-gas cleaning device is disposed behind the engine with respect to a vehicle-body front side such that a long side of the second exhaust-gas cleaning device is substantially parallel to the vehicle-body lateral width direction,
a maximum length of the first exhaust-gas cleaning device in a vehicle-body vertical direction is shorter than a maximum length of the first exhaust-gas cleaning device in a vehicle-body longitudinal direction,
the tractor further comprises:
a driving unit located behind the engine compartment;
a partition that separates the engine compartment from the driving unit and extends over a back location of the second exhaust-gas cleaning device and a lower location of the second exhaust-gas cleaning device, wherein
a portion of the partition positioned at the lower location is positioned further to the vehicle-body front side than a portion of the partition positioned at the back location; and an electrical wire that extends over the engine compartment and the driving unit, wherein
the electrical wire is installed along the portion of the partition positioned at the lower location in the driving unit.

7. The tractor according to claim 1, wherein
the first exhaust-gas cleaning device:
communicates with the engine through an exhaust-gas suction pipe that sucks the exhaust gas from the engine,
is configured to be swingable with the exhaust-gas suction pipe as a swinging shaft, and
is fixed such that one lateral-end portion of the first exhaust-gas cleaning device is disposed closer to the second exhaust-gas cleaning device than is another lateral-end portion of the first exhaust-gas cleaning device.

* * * * *